US011644837B2

(12) United States Patent
Plawecki et al.

(10) Patent No.: US 11,644,837 B2
(45) Date of Patent: May 9, 2023

(54) SYSTEMS AND METHODS FOR OUTPUT BIASING OF A MACHINE LEARNING RECOMMENDATION ENGINE (71) Applicants: Nathan D. Plawecki, Melbourne, FL (US); Aaron R. Ladurini, Palm Bay, FL (US); Daniel W. Plawecki, Melbourne, FL (US)

(72) Inventors: Nathan D. Plawecki, Melbourne, FL (US); Aaron R. Ladurini, Palm Bay, FL (US); Daniel W. Plawecki, Melbourne, FL (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 218 days.

(21) Appl. No.: 17/095,434

(22) Filed: Nov. 11, 2020

(65) Prior Publication Data
US 2022/0147065 A1 May 12, 2022

(51) Int. Cl.
G05D 1/00 (2006.01)
G05D 1/10 (2006.01)
(Continued)

(52) U.S. Cl.
CPC ........ G05D 1/0088 (2013.01); G05B 13/0265 (2013.01); G05D 1/1062 (2019.05); G08G 5/0039 (2013.01); G08G 5/0091 (2013.01)

(58) Field of Classification Search
CPC ............... G05D 1/1062; G05D 1/0088; G05B 13/0265; G08G 5/0039; G08G 5/0091
See application file for complete search history.

(56) References Cited

U.S. PATENT DOCUMENTS 11,397,428 B2 * 7/2022 Celia .................. G06F 18/00
2002/0161489 A1 * 10/2002 Johnson .............. G05D 1/0833
701/4

(Continued)

OTHER PUBLICATIONS

International Search Report for corresponding PCT/US2021/053016 dated Feb. 8, 2022.

Primary Examiner — Dale W Hilgendorf
Assistant Examiner — Hana Lee
(74) Attorney, Agent, or Firm — Tarolli, Sundheim, Covell & Tummino LLP (57) ABSTRACT In some examples, systems and methods are described for output biasing maneuvers recommendations provided by at least one machine learning maneuver-recommendation (MLM) engine executing on an aerial vehicle. In some examples, output biasing data can be received that includes at least one risk tuning parameter that can influence which of the maneuver recommendations are selected by a maneuver decision engine executing on the aerial vehicle based on a maneuver confidence threshold for implementation by the aerial vehicle. The maneuver confidence threshold can be updated based on the at least one risk tuning parameter to provide an updated maneuver confidence threshold for the output biasing of the maneuvers recommendation provided by the at least one MLM engine. Vehicle command data for implementing a given maneuver recommendation can be outputted based on an evaluation of the updated maneuver confidence threshold.

18 Claims, 4 Drawing Sheets (51) Int. Cl.
 *G05B 13/02* (2006.01)
 *G08G 5/00* (2006.01)

(56) References Cited

U.S. PATENT DOCUMENTS

| | | | |
|---|---|---|---|
| 2018/0190132 A1* | 7/2018 | Cronkhite | G08G 5/0013 |
| 2019/0384257 A1* | 12/2019 | Zhang | G05B 19/4065 |
| 2020/0142410 A1* | 5/2020 | Liu | G05D 1/0088 |
| 2020/0201358 A1* | 6/2020 | Corsica | B64C 39/024 |
| 2020/0250993 A1* | 8/2020 | Li | G08G 5/0043 |
| 2020/0286391 A1* | 9/2020 | Beaurepaire | G08G 5/0091 |
| 2021/0139022 A1* | 5/2021 | Tao | B60W 30/0956 |
| 2022/0067589 A1* | 3/2022 | Burg | G06N 20/00 |

* cited by examiner

SYSTEMS AND METHODS FOR OUTPUT BIASING OF A MACHINE LEARNING RECOMMENDATION ENGINE

TECHNICAL FIELD

The present disclosure relates to systems and methods for output biasing a machine learning (ML) recommendation engine.

BACKGROUND

ML is a subset of artificial intelligence in which a computer uses algorithms and statistical models to accurately perform tasks without using explicitly coded instructions after having analyzed a learning or training data set, in effect relying on patterns and inferences to generalize from past experiences. ML-based systems can be capable of solving problems not previously seen or considered and for which it would not be possible to code for every individual case. Types of ML algorithms include, among others, supervised learning, unsupervised learning, and feature learning. Types of ML models that can be trained on the training data include artificial neural networks, decision trees, support vector machines, regression analysis models, Bayesian networks, genetic algorithms, principal components analysis, and cluster analysis.

Fly-by-wire (FBW) is a system that has replaced conventional manual flight controls of an aerial vehicle with an electronic interface. Fly-by-wire controls use sensors and computers to translate pilot inputs into commands. The commands transmit to the aircraft's actuators to move the control surfaces. These surfaces, such as ailerons, spoilers, and rudders, generate the torque needed to control the movement of the aircraft. Aerial vehicles such as unmanned aerial vehicles (UAVs) employ an onboard flight system that allows for maneuvering the UAV by an operator from a remote location, autonomously, and/or semi-autonomously. The onboard flight system can interface with various sensors of the aerial vehicle to receive sensor information and make maneuver decisions based on the sensor information, mission information, and/or flight control information. The flight control information can correspond to commands and/or instructions that can be provided by the operator or stored locally (e.g., in memory) at the UAV. When operated in autonomous mode, UAVs can be configured to perceive situations to make autonomous decisions to maneuver the aerial vehicle during flight.

Weather is a temporary condition that occurs in an atmosphere that surrounds a celestial body, such as Earth. Weather is generally characterized by the following factors: temperature, atmospheric pressure, wind, humidity, precipitation, and cloudiness. Because these weather factors are always changing, each unique combination describes a different type of meteorological condition. Adverse weather conditions such as thunderstorms pose a risk to aerial vehicles during flight. In general, aerial vehicles are maneuvered (e.g., flown) around thunderstorms, as wind shears can cause structural damage to the aerial vehicle, and in some examples, destroying the aerial vehicle.

SUMMARY

The present disclosure relates to systems and methods for output biasing a ML recommendation engine.

In an example, a method can include receiving output biasing data that can include at least one risk tuning parameter for output biasing maneuver recommendations for an aerial vehicle being provided by at least one machine learning maneuver-recommendation (MLM) engine. The method can further include receiving a maneuver confidence threshold that can correspond to a first level of structural damage that the aerial vehicle can be permitted to experience during implementations of the maneuver recommendations. The method can further include updating the maneuver confidence threshold based on the at least one risk tuning parameter to influence the maneuver recommendations selected by the maneuver decision engine for implementation by the aerial vehicle to provide an updated maneuver confidence threshold. The updated maneuver confidence threshold can correspond to a second level of structural damage that the aerial vehicle can be permitted to experience during the implementation of the maneuver recommendations. The method can further include receiving a given maneuver recommendation provided by the at least one MLM engine and outputting vehicle command data for implementing the given maneuver recommendation based on an evaluation of the updated maneuver confidence threshold.

In another example, a system can include memory to store machine-readable instructions and data. The data can include output biasing data that can include at least one risk tuning parameter for output biasing maneuver recommendations for an aerial vehicle being provided by at least one MLM engine and a maneuver confidence threshold that can correspond to a first level of structural damage that the aerial vehicle can be permitted to experience during implementations of the maneuver recommendations. The system can further include one or more processors to access the memory and execute the machine-readable instructions. The machine-readable instructions can include an output biasing module and a maneuver decision module. The output biasing module can be programmed to adjust the maneuver confidence threshold based on the at least one risk tuning parameter to influence the maneuver recommendations selected by the maneuver decision engine for implementation by the aerial vehicle to provide an adjusted maneuver confidence threshold. The adjusted maneuver confidence threshold can correspond to a second level of structural damage that the aerial vehicle can be permitted to experience during the implementations of the maneuver recommendations. The maneuver decision module can be programmed to communicate with the output biasing module to receive the adjusted maneuver confidence threshold and receive maneuver data provided by the at least one MLM engine. The maneuver data can include a given maneuver recommendation for the aerial vehicle and a maneuver confidence score that can be indicative of a probability of the aerial vehicle suffering structural damage in response to or while implementing the given maneuver recommendation. The maneuver decision module can be programmed to evaluate the maneuver confidence score relative to the adjusted maneuver confidence threshold to determine whether the aerial vehicle is to implement the given maneuver recommendation.

In a further example, a method can include receiving output biasing data that can include a plurality of risk tuning parameters for output biasing maneuver recommendations for an aerial vehicle being provided by at least one MLM engine. The method can further include receiving from a maneuver decision engine a maneuver confidence threshold that can correspond to a first level of structural damage that the aerial vehicle can be permitted to experience during implementations of the maneuver recommendations. The method can further include biasing the maneuver confidence threshold based on the plurality of tuning parameters to influence the maneuver recommendations selected by the maneuver decision engine for implementation by the aerial vehicle to provide a biased maneuver confidence threshold. The biased maneuver confidence threshold can correspond to a second level of structural damage that the aerial vehicle can be permitted to experience during the implementations of the maneuver recommendations. The method can further include receiving maneuver data provided by the at least one MLM engine. The maneuver data can include a given maneuver recommendation for the aerial vehicle and a maneuver confidence score that can be indicative of a probability of the aerial vehicle suffering structural damage in response to or while implementing the given maneuver recommendation. The method can further include causing the aerial vehicle to implement the given maneuver recommendation based on an evaluation of the maneuver confidence score relative to the biased maneuver confidence threshold.

DETAILED DESCRIPTION

The present disclosure relates to systems and methods for output biasing an ML recommendation engine. ML algorithms currently used in safety-critical decision-making environments are not designed to either be altered for aerial vehicle risk. As such, ML algorithms employed in safety-critical applications, such as vehicle flight control systems, do not allow for alterations (e.g., tuning) of output decisions of ML algorithms based on a level of assumed risk that has been determined acceptable for the ML algorithm. For example, aerial vehicles implementing ML algorithms are programmed to implement maneuver recommendations based on a maneuver ruleset that defines or limits aerial maneuvers of the aerial vehicle, such as entry into restricted air space, flying through adverse weather conditions (e.g., thunderstorms), and the like.

The maneuver ruleset is preloaded onto the aerial vehicle before take-off and is used to limit exposure of the aerial vehicle to structural damage or reduce a likelihood that the aerial vehicle suffers structural damage during flight, such as while implementing a mission. If the recommended maneuver violates at least one rule of the maneuver ruleset, a different recommended maneuver by the ML algorithm is implemented that does not violate or cause the aerial vehicle to violate the predefined ruleset. In some aerial vehicle applications, it is desirable to elevate or reduce a structural risk to the aerial vehicle (e.g., during flight) and thus override the at least one rule of the maneuver ruleset, such as to accomplish a mission, an objective, or increase a likelihood that the aerial vehicle reaches a safe location (e.g., in examples wherein the aerial vehicle is low on fuel). Thus, it desirable, in some aerial vehicle applications, to increase or decrease a level of structural risk assumed by the aerial vehicle. The term "structural risk" as used herein in relating to an aerial vehicle can refer to any damage on an airframe that can lead to loss of the aerial vehicle and/or damage to a mission payload. In some examples, damage to the mission payload can lead to mission failure or loss.

Systems and methods are described herein for output biasing of ML algorithms employed in aerial vehicles, such that the level of structural risk to the aerial vehicle can be increased or decreased based on a respective aerial vehicle application. By biasing output maneuver recommendations being provided at least one MLM engine enables tuning of the at least one MLM engine, such that the aerial vehicle can complete a mission within defined mission parameters or implement maneuvers that increase or decrease the structural risk to the aerial vehicle based on a corresponding aerial vehicle application. Moreover, by output biasing the maneuver recommendations can improve a likelihood that the aerial vehicle reaches a safe location (e.g., by implementing maneuvers that pose a greater structural risk to the aerial vehicle, however, increase the likelihood that the aerial vehicle reaches the safe location).

In some examples, the system and methods described herein can influence the output decisions of a maneuver decision engine and thus modify a behavior of the at least one MLM engine by determining which output decisions of the at least one MLM engine are to be employed for aerial vehicle maneuvering based on a level of assumed risk. The assumed level of risk can correspond to a level of structural risk or damage that has been determined acceptable for the aerial vehicle, such as a UAV. In some examples, the assumed level of risk can be user-defined. The aerial vehicle can be implemented as a semi-autonomous aerial vehicle or an autonomous vehicle.

While examples are presented herein output biasing of MLM engines in context of vehicle applications (e.g., safety-critical vehicle applications, such as aerial vehicle flight control systems of aerial vehicles), in other examples the systems and methods described herein can be employed for output biasing of other ML recommendation engines used in other types of vehicle or equipment applications, such as commercial equipment, industrial machinery, petrochemical equipment, medical equipment, ground vehicles, and water vehicles (e.g., submarines, boats, and the like), which can include semi-autonomous and autonomous vehicles.

In some examples, an output biasing module can be employed at a maneuver decision engine of a flight control system of the aerial vehicle. The maneuver decision engine can be programmed to receive maneuver recommendations for the aerial vehicle from the at least one MLM engine and determine (e.g., decide) whether a respective maneuver recommendation is to be implemented by the aerial vehicle. The output biasing module can be programmed to receive output biasing data that can include at least one risk tuning parameter for output biasing maneuver recommendations for the aerial vehicle being provided by the at least one MLM engine. The output biasing data can be received by the aerial vehicle, such as during flight or prior to take-off. Each risk tuning parameter of the output biasing data can contribute a respective amount of structural risk to the aerial vehicle that can collectively define an overall amount of structural risk to the aerial vehicle that has been determined as acceptable for the aerial vehicle in response to or while implementing the maneuver recommendations. Accordingly, risk tuning parameters can be used to control which recommended maneuvers are selected by the maneuver decision engine for implementation by the aerial vehicle.

The output biasing module can be programmed to update the maneuver confidence threshold based on the at least one risk tuning parameter to influence the maneuver recommendations selected by the maneuver decision engine for implementation by the aerial vehicle to provide an updated maneuver confidence threshold. The updated maneuver confidence threshold can correspond to a second level of structural damage that the aerial vehicle can be permitted to experience during the implementations of the maneuver recommendations. In some examples, a maneuver recommendation that is provided by the at least one MLM engine can be evaluated based on the updated maneuver confidence threshold. The maneuver recommendation can be implemented based on an evaluation of the updated maneuver confidence threshold. Accordingly, the system and methods described herein can influence the output decisions of each MLM engine and thus modify a behavior of the MLM engine by determining at the maneuver decision engine which output decisions of the ML algorithm are used for aerial vehicle maneuvering.

Figure 1:
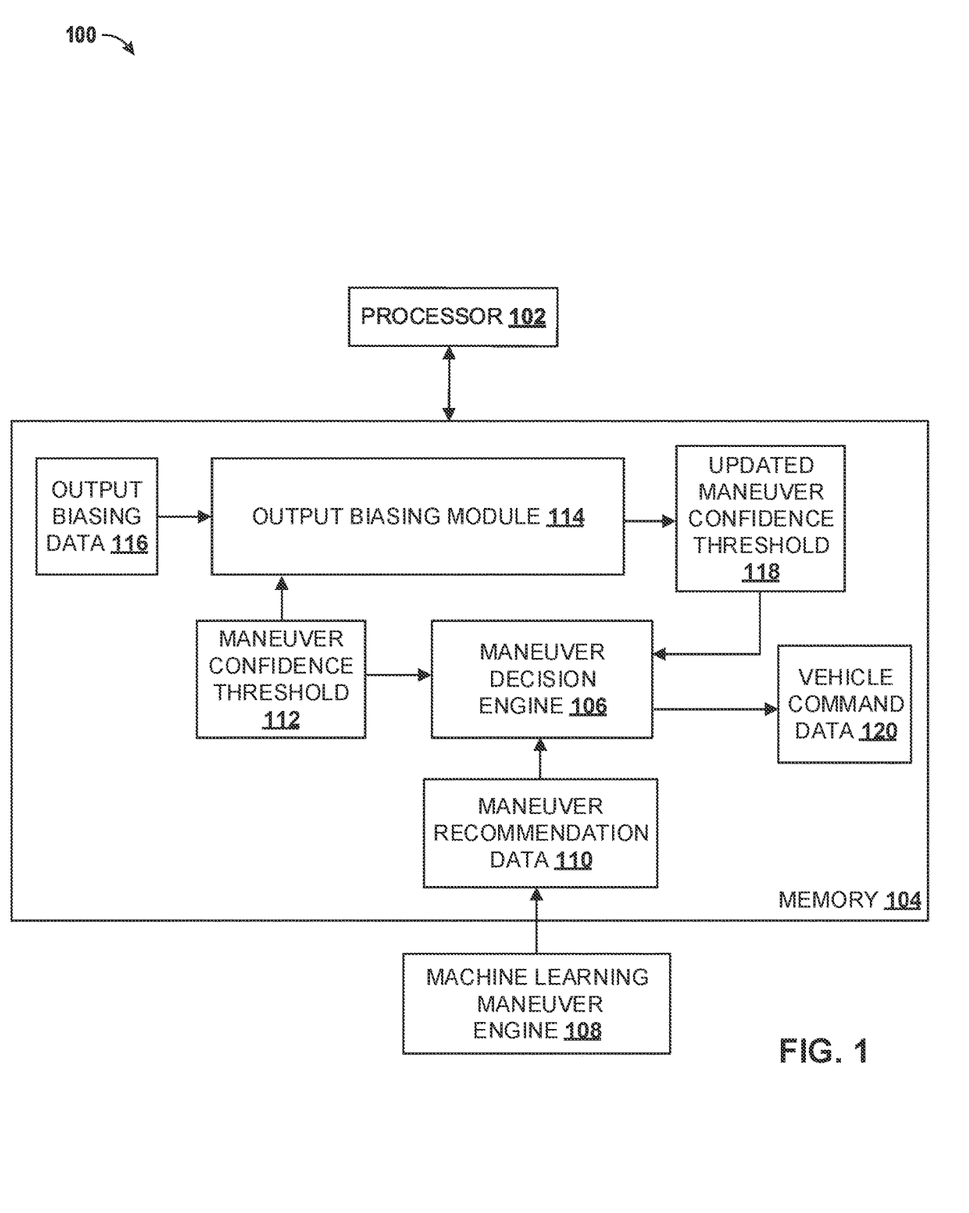
FIG. 1 illustrates an example of a maneuver recommendations output biasing system.

FIG. 1 illustrates an example of a maneuver recommendations output biasing system 100. The system 100 can include one or more processors 102 and memory 104. The one or more processors 102 can access the memory 104 and execute the machine-readable instructions stored therein to implement one or more functions as described herein. The memory 104 can be implemented as volatile memory (e.g., random access memory) and/or non-volatile memory (e.g., a solid-state drive, a hard disk drive, flash memory, and the like). In some examples, the system 100 can be implemented as one or more servers that execute application software on top of an operating system. In some examples, the system can be implemented on or as part of a flight control system, for example, as described herein. The memory 104 can include a maneuver decision engine 106.

The maneuver decision engine 106 can be programmed to communicate with at least one MLM engine 108. In some examples, the at least one MLM engine 108 can be programmed to identify or determine one or more flight paths for maneuvering an aerial vehicle with respect to an adverse weather condition. Adverse weather conditions are weather events that occur in an atmosphere of a celestial body (e.g., Earth). For example, weather events can include a storm, such as a thunderstorm, a snowstorm, a rainstorm, an ice storm, a hurricane, a tropical cyclone, a windstorm, a dust storm, a blizzard, and a sandstorm. In some examples, the memory 104 includes the MLM engine 108 and in other examples, the MLM engine 108 can be stored at a memory location on the aerial vehicle that can be access executed by the one or more processors 102 or one or more other processors of the aerial vehicle.

In some examples, the at least one MLM engine 108 can be programmed to generate at least one maneuver recommendation for maneuvering the aerial vehicle. In some examples, the at least one MLM engine 108 can be programmed to generate a maneuver confidence score that can be indicative of a probability of the aerial vehicle suffering structural damage in response to or while implementing a respective maneuver recommendation. By way of example, the at least one MLM engine 108 can be programmed to generate maneuver recommendation data 110 that can include a given maneuver recommendation for the aerial vehicle and a corresponding maneuver confidence score.

The maneuver decision engine 106 can be programmed to evaluate the maneuver confidence score relative to a maneuver confidence threshold 112 to determine whether the aerial vehicle is to implement the given maneuver recommendation. In some examples, the maneuver confidence threshold 112 can be user-defined. The maneuver confidence threshold 112 can correspond to a first level of structural damage that the aerial vehicle can be permitted to experience during the implementations of the maneuver recommendations. In some examples, the maneuver decision engine 106 can be programmed to communicate with an output biasing module 114. In some examples, the maneuver decision engine 106 can include the output biasing module 114. The output biasing module 114 can be employed to bias the output maneuver recommendations that are provided by the at least one MLM engine 108 based on output biasing data 116.

The output biasing data 116 can include at least one risk tuning parameter for output biasing the maneuver recommendations for the aerial vehicle being provided by the at least one MLM engine 108. The output biasing module 114 can be programmed to update the maneuver confidence threshold based on the at least one risk tuning parameter to influence the maneuver recommendations selected by the maneuver decision engine 106 for implementation by the aerial vehicle to provide an updated maneuver confidence threshold 118. The updated maneuver confidence threshold 118 can correspond to a second level of structural damage that the aerial vehicle can be permitted to experience during the implementations of the maneuver recommendations. In some examples, the second level of structural damage can be greater than the first level of structural damage that the aerial vehicle can be permitted to experience during the implementation of the maneuver recommendations. In other examples, the second level of structural damage is less than the first level of structural damage.

In some examples, the output biasing module 114 can be programmed to multiply or divide the maneuver confidence threshold 112 by one or more scale factor values of the at least one risk tuning parameter to provide the updated maneuver confidence threshold to influence which of the maneuver recommendations are selected by the maneuver decision engine 106 corresponding to the output biasing of the at least one MLM engine 108. In further examples, the output biasing module 114 can be programmed to add or subtract the one or more scale factor values of the at least one risk tuning parameter from the maneuver confidence threshold to provide the updated maneuver confidence threshold to influence which of the maneuver recommendations are selected by the maneuver decision engine 106 corresponding to the output biasing of the at least one MLM engine 108. In some examples, the output biasing data 116 can include a plurality of risk tuning parameters that each contribute a respective amount of structural risk to the aerial vehicle, and thus can collectively define an overall amount of structural risk to the aerial vehicle.

In some examples, the maneuver decision engine 106 can be programmed to receive maneuver recommendation data 110 that includes a given maneuver recommendation and a respective maneuver confidence threshold. The maneuver decision engine 106 can be programmed to generate outputting vehicle command data 120 for implementing the given maneuver recommendation based on an evaluation of the updated maneuver confidence threshold 118. For example, the maneuver decision engine 106 can be programmed to evaluate the respective maneuver confidence score relative to the updated maneuver confidence threshold 118 to determine whether the aerial vehicle is to implement the given maneuver recommendation. The maneuver decision engine 106 can be programmed to output the vehicle command data 120 for implementing the given maneuver recommendation based on the evaluation indicating that the maneuver confidence score is greater or equal to the updated maneuver confidence threshold 118.

Accordingly, the output biasing module 114 can be programmed to influence the output decisions of the maneuver decision engine 106 and thus modify the behavior of the at least one MLM engine 108 by determining which output decisions of the at least one MLM engine 108 are to be employed for aerial vehicle control based on a level of assumed risk as defined by the output biasing data 116. As such, the output biasing module 114 can be programmed to allow for alterations (e.g., tuning) of output decisions of the at least one MLM engine 108 based on a level of assumed risk that has been determined acceptable for the at least one MLM engine 108 according to the output biasing data 116.

Figure 2:
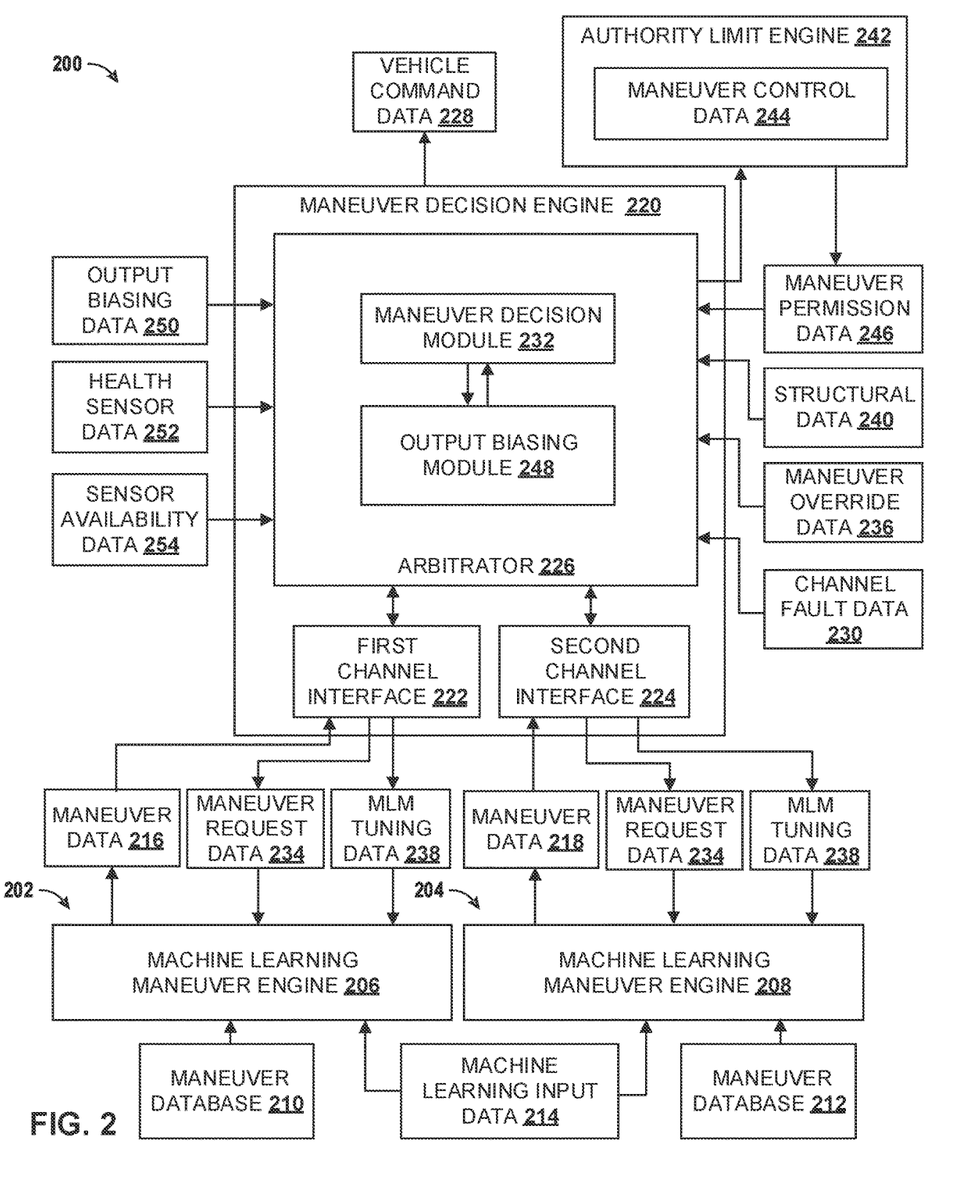
FIG. 2 illustrates an example of a flight control system of an aerial vehicle configured with a maneuver recommendations output biasing system.

FIG. 2 illustrates an example of a flight control system 200 of an aerial vehicle configured with a maneuver recommendations output biasing system, such as the maneuver recommendations output biasing system 100, as illustrated in FIG. 1. Therefore, reference may be made to the example of FIG. 1 in the following description of the example of FIG. 2. By way of example, the flight control system 200 can include a first channel 202 and a second channel 204. The flight control system 200 can be representative of a primary flight control system of an aerial vehicle, such as a manned aerial vehicle or a UAV. By implementing the flight control system 200 with two channels, the flight control system 200 can reduce channel faults and systematic errors in a flight control architecture of the aerial vehicle. In some examples, the flight control system 200 can be a secondary flight control system and can be operated in response to the primary flight control system experiencing a fault or failure. Each of the first and second channels 202 and 204 can include one or more processors that can include a memory. The one or more processors can access a corresponding channel memory and execute machine-readable instructions stored therein. Thus, each of the first and second channels 202 and 204 can include a respective MLM engine 206 and 208, as illustrated in FIG. 2. Each of the MLM engines 206 and 208 can be programmed to provide maneuver recommendations for controlling aerial actions and/or movements of the aerial vehicle. In some examples, the MLM engines 206 and 208 can respectively correspond to the MLM engine 108, as illustrated in FIG. 1.

In some examples, the MLM engines 206 and 208 can correspond to respective MLM models that have been trained based on maneuver training data. The maneuver training data can characterize a plurality of maneuvers implemented by one or more aerial vehicles with respect to obstacles, objects, flight control rules, adverse weather conditions, a mission, and/or mission parameters. In some examples, the maneuver training data can characterize a plurality of past aerial conditions and associated maneuvers or actions implemented by one or more aerial vehicles with respect to a corresponding aerial condition of the plurality of aerial conditions. Thus, in some examples, the MLM engines 206 and 208 can be trained to identify flight paths with respect to adverse weather conditions. As such, the MLM engines 206 and 208 can be programmed to generate flight instructions and/or commands for the aerial vehicle to maneuver the aerial vehicle with respect to an adverse weather condition. Therefore, in some examples, each flight path identified by the MLM engines 206 and 208 can be associated with a set of flight instructions and/or commands for the aerial vehicle, such that the aerial vehicle can be maneuvered with respect to the adverse weather condition, for example, through the adverse weather condition.

In some examples, each of the first and second channels 202 and 204 can include a maneuver database 210 and 212. The maneuver databases 210 and 212 can include past maneuver data characterizing one or more past maneuvers implemented by the aerial vehicle with respect to obstacles detected or sensed by the aerial vehicle, objects detected or sensed by the aerial vehicle, flight control rules for controlling maneuvers of the aerial vehicle, adverse weather conditions (e.g., thunderstorms), previous missions and/or mission parameters of the previous missions implemented by the aerial vehicle. In some examples, the past maneuver data can characterize one or more past adverse weather conditions detected (e.g., observed) and/or experienced by the aerial vehicle. Thus, the maneuver databases 210 and 212 can characterize past weather development patterns detected or experienced by the aerial vehicle. In some examples, the MLM engines 206 and 208 can be programmed to receive ML input data 214. The ML input data 214 can include sensor data from one or more sensors of the aerial vehicle. In some examples, the ML input data 214 can include remote data from one or more systems, sensors, and/or devices that are implemented at a remote location (e.g., at a command center). Thus, the aerial vehicle can be in communication with the remote location to receive the remote data.

In some examples, the aerial vehicle can be configured to store the sensor data from the one or more sensors of the aerial vehicle and/or the remote data at a storage location of the aerial vehicle that can be accessed by each of the MLM engines 206 and 208. The one or more sensors can include cameras, gyroscopes, laser altimeters, accelerometers (e.g., 3-axis accelerometers connected to a Global Positioning System (GPS) and an Inertial Measurement Unit (IMU) to compute an accurate position and orientation), vehicle speed-sensors, direction, compass heading, wind sensors, light sensors, laser rangefinders, microphones, speakers, pressure transducers, thermometers, barometers, Sound Detection And Ranging (SONAR) sensors, a ground-penetrating radar, Light Detection And Ranging (LIDAR) sensors, laser illumination systems radar sensors, magnetometers, day/night light sensors, optical beacon locators, laser illumination systems, gimbal input systems, voice input detection microphone-bases systems, RF receivers and transmitters, weather sensors (e.g., for detecting temperature, wind, rain, snow, hail, lightning, thunder, and the like), defense sensors (e.g. gunfire locator systems, explosion locator systems, and the like).

Thus, in some examples, the ML input data 214 can include weather sensor data, other sensor data, and flight mission data characterizing a respective mission and one or more mission parameters. The weather sensor data can characterize the adverse weather condition. For example, if the adverse weather condition is a storm, the weather sensor data can characterize one or more characteristics of the thunderstorm. Thus, in some examples, the weather sensor data can characterize precipitation, convective cell activity, and/or intensity of the precipitation of the thunderstorm. During the flight of the aerial vehicle, each of the MLM engines 206 and 208 can be programmed to receive or retrieve the weather sensor data generated by one or more weather sensors of the aerial vehicle.

In some examples, the other sensor data can be generated by one or more non-weather sensors of the aerial vehicle. The one or more non-weather sensors can include at least one camera and the other sensor data can include one or more camera images of the adverse weather condition. In some examples, the one or more non-weather sensors can include an airspeed sensor and/or an altitude sensor, and thus the other sensor data can characterize the airspeed and/or the altitude of the aerial vehicle. In some examples, the other sensor data can be indicative or include turbulence information and information characterizing other flight hazards. The flight mission data can characterize the current mission and corresponding mission parameters of the aerial vehicle. In some examples, the flight mission data can characterize a level of importance of a mission being implemented by the aerial vehicle.

In some examples, such during flight, each of the MLM engines 206 and 208 can be programmed to receive the ML input data 214 and the past maneuver data from a respective maneuver database 210 and 212. Each MLM engine 206 and 208 can be programmed to provide maneuver recommendations for the aerial vehicle and a maneuver confidence score for each maneuver recommendation. Thus, each of the MLM engines 206 and 208 can be programmed to generate maneuver recommendation data 216 characterizing a recommended maneuver for the aerial vehicle and a respective maneuver confidence score for the recommended maneuver. In some examples, the maneuver recommendation data 216 and 218 can characterize flight instructions and/or commands for the aerial vehicle to maneuver the aerial vehicle (e.g., with respect to the adverse weather condition).

The maneuver confidence score can be indicative of a probability of the aerial vehicle suffering structural damage in response to or while implementing the recommended maneuver. Thus, the maneuver confidence score can be indicative of a probability of the aerial vehicle implementing the recommended maneuver successfully. A successful maneuver by the aerial vehicle can correspond to a level of structural damage that the aerial vehicle can experience that has been determined as acceptable for the aerial vehicle. In some examples, the maneuver confidence score can be indicative of a probability of successfully maneuvering the aerial vehicle through the adverse weather condition according to a respective flight path.

In some examples, each of the MLM engines 206 and 208 can be programmed to process the ML input data 214 to identify or determine at least one flight path for maneuvering the aerial vehicle through the adverse weather condition and a flight path confidence score for the at least one flight path. In some examples, each of the MLM engines 206 and 208 can be programmed to identify the at least one flight path further based on the past maneuver data from the corresponding maneuver databases 210 and 212. The flight path confidence score for the at least one flight path can be indicative of a probability of successfully maneuvering the aerial vehicle through the adverse weather condition according to the at least one flight path. In some examples, the maneuver recommendation data 216 and 218 can identify the at least one flight path with respect to the adverse weather condition (e.g., through the adverse weather condition) and corresponding set of flight instructions and/or commands for the vehicle, such that the aerial vehicle can be maneuvered with respect to the adverse weather condition. By way of further example, the at least one flight path can correspond to the recommended maneuver. Accordingly, in some examples, the maneuver recommendation data 216 generated by each MLM engine 206 and 208 can identify at least one flight path with respect to the adverse weather condition and respective flight commands and/or instructions for maneuvering the aerial vehicle according to the at least one flight path.

By way of further example, the flight control system 200 can include a maneuver decision engine 220. The maneuver decision engine 220 can include a first channel input interface 222 and a second channel input interface 224. The first channel input interface 222 can be programmed to receive the maneuver recommendation data 216 provided by the MLM engine 206. The second channel input interface 224 can be programmed to receive the maneuver recommendation data 218 provided by the MLM engine 208. Each of the first and second channel input interfaces 222 and 224 can be programmed to provide respective maneuver recommendation data 216 and 218 to an arbitrator 226 of the maneuver decision engine 220. The arbitrator 226 can be programmed to determine which maneuver recommendation data 216 and 218 and thus recommended maneuver is to be employed to generate vehicle command data 228 for implementing the recommended maneuver by the aerial vehicle. In some examples, the vehicle command data 228 can characterize the flight control commands and/or instructions for the aerial vehicle for maneuvering the aerial vehicle (e.g., such as around or through the adverse weather conditions). In some examples, the vehicle command data 228 can correspond to the vehicle command data 120, as illustrated in FIG. 1.

In some examples, the arbitrator 226 can be programmed to determine whether if any of the first and second channels 202 and 204 are experiencing a channel fault. For example, the arbitrator 226 can be programmed to receive channel fault data 230 that can characterize one or more channel faults that can be present within the first and second channels 202 and 204. A channel fault can correspond to a channel condition that can induce or cause one or more errors (e.g., data errors, maneuver recommendations, and the like) in a corresponding channel. By way of example, the channel fault can correspond to a buffer overrun fault, an input data overrun fault, an initialization fault, and the like. In some examples, the channel fault can cause a respective MLM engine 206 and 208 to output different maneuver recommendation data 216 and 218 with different recommended maneuvers and/or with different maneuver confidence scores for respective recommended maneuvers.

In some examples, the arbitrator 226 can include a maneuver decision module 232. The maneuver decision module 232 can correspond to a set of instructions for processing the maneuver recommendation data 216 and/or 218 to determine a recommended maneuver for implementation by the aerial vehicle. Thus, the maneuver decision module 232 can be programmed to generate the vehicle command data 228 for implementing the recommended maneuver. In some examples, the maneuver decision module 232 can be programmed to compare each maneuver confidence score from respective maneuver recommendation data 216 and 218 to determine whether the maneuver confidence scores match. If the maneuver confidence scores match and similar maneuvers are being recommended by the maneuver recommendation data 216 and 218, the maneuver decision module 232 can be programmed to compare a respective maneuver confidence score from the respective maneuver recommendation data 216 and 218 to a maneuver confidence threshold to determine whether the recommended maneuver is to be implemented by the aerial vehicle. In some examples, the maneuver confidence threshold can correspond to the maneuver confidence threshold 112, as illustrated in FIG. 1.

The maneuver confidence threshold can correspond to a level of risk that has been selected or determined as acceptable for implementing the recommended maneuvers by the aerial vehicle. In some examples, the maneuver confidence threshold can correspond to a first level of structural damage that the aerial vehicle is permitted to experience during the implementation of the maneuver recommendations. If the respective maneuver confidence score is greater than or equal to the maneuver confidence threshold, the maneuver decision module 232 can be programmed to generate the vehicle command data 228 to implement the recommended maneuver. In some examples, the maneuver confidence threshold corresponds to a flight path confidence threshold. The flight path confidence threshold can correspond to a level of structural risk that has been selected or determined as acceptable for the aerial vehicle.

In some examples, if the respective maneuver confidence score is less than the maneuver confidence threshold, the maneuver decision module 232 can be programmed to generate maneuver request data 234 for updated maneuver recommendation data. The updated maneuver recommendation data can include a new maneuver recommendation and a respective maneuver confidence score for the new maneuver recommendation. Each of the MLM engines 206 and 208 can be programmed to provide the updated maneuver recommendation data in response to receiving the maneuver request data 234 from a corresponding channel interface 224 and 224, as illustrated in FIG. 2. The maneuver decision module 232 can be programmed to evaluate the updated maneuver recommendation data to determine whether the updated maneuver recommendation is to be implemented by the aerial vehicle in a same or similar manner as described herein with respect to the maneuver recommendation data 216 and 218.

In some examples, the maneuver confidence scores from the maneuver recommendation data 216 and 218 do not match, however, similar maneuvers are being recommended by the maneuver recommendation data 216 and 218. The maneuver decision module 232 can be programmed to select or identify the greatest maneuver confidence score among the maneuver confidence scores and compare this maneuver confidence score to the maneuver confidence threshold to determine whether the recommended maneuver is to be implemented by the aerial vehicle. The maneuver decision module 232 can be programmed to communicate with each corresponding MLM engine 206 and 208 to receive the updated maneuver recommendation data in response to determining that the greatest maneuver confidence score among the maneuver confidence scores is less than the maneuver confidence threshold. The maneuver decision module 232 can be programmed to evaluate the updated maneuver recommendation data to determine whether the updated maneuver recommendation is to be implemented by the aerial vehicle in a same or similar manner as described herein with respect to the maneuver recommendation data 216 and 218.

In some examples, each of the first and second channels 202 and 204 can include faults based on the channel fault data 230. For example, the first channel 202 can include a major channel fault (e.g., buffer overrun), and the second channel 204 can include a minor channel fault. The maneuver decision module 232 can be programmed to select the maneuver confidence score associated with the second channel 204 in response to determining that the second channel 304 is not experiencing the major channel fault based on the channel fault data 230. The maneuver decision module 232 can be programmed to compare the maneuver confidence score from the maneuver recommendation data 218 to the maneuver confidence threshold to determine whether the recommended maneuver is to be implemented by the aerial vehicle. The maneuver decision module 232 can be programmed to communicate with the second MLM engine 208 to receive the updated maneuver recommendation data in response to determining that the maneuver confidence score from the maneuver data 218 is less than the maneuver confidence threshold. The maneuver decision module 232 can be programmed to evaluate the updated maneuver recommendation data to determine whether the updated maneuver recommendation is to be implemented by the aerial vehicle in a same or similar manner as described herein with respect to the maneuver recommendation data 216 and 218.

In some examples, the maneuver decision module 232 can be programmed to evaluate each flight path confidence score for each flight path relative to a flight path confidence threshold to identify a given flight path through the adverse weather condition. In some examples, the maneuver decision module 232 can be programmed to select the flight path confidence threshold from a list of flight path confidence thresholds based on the importance of the mission being implemented by the aerial vehicle. For example, if the aerial vehicle is implementing a critical mission, the flight path confidence threshold can be selected from the list of flight path confidence thresholds that can influence a structural risk to the aerial vehicle corresponding to a likelihood of the aerial vehicle suffering structural damage (e.g., from lighting, hail, and the like) while being maneuvered through the adverse weather condition. Thus, in some examples, the selected flight path by the maneuver decision module 232 through the adverse weather condition can pose an increased level of structural risk to the aerial vehicle, however, permit the aerial vehicle to complete the mission within defined mission parameters (e.g., within a predetermined amount of time). Accordingly, the given flight path can correspond to a flight route through the adverse weather condition according to which the aerial vehicle can be maneuvered that can have a risk level that is acceptable corresponding to an acceptable amount of structural damage that the aerial vehicle can experience from the adverse weather condition.

In some examples, the maneuver decision module 232 can be programmed to compare each flight path confidence score to the flight path confidence threshold to identify one or more flight paths that are nearest to the flight path confidence threshold or greater than or equal to the flight path confidence threshold. In further examples, the maneuver decision module 232 can be programmed to evaluate each flight path confidence score for each flight path relative to the flight path confidence threshold to identify at least two flight paths of the plurality of flight paths through the adverse weather condition that can be greater than the flight path confidence threshold. The maneuver decision module 232 can be programmed to evaluate the flight mission data that can be indicative of the level of importance of the mission being implemented by the aerial vehicle relative to a mission importance threshold.

The maneuver decision module 232 can be programmed to select the given flight path from the at least two flight paths through the adverse weather condition based on the evaluation of the flight mission data relative to the mission importance threshold. By way of example, if the level of importance of the mission is indicated as critical by the flight mission data, the maneuver decision module 232 can be programmed to select the given flight path from the at least two flight paths through the adverse weather condition that has a lowest flight path confidence score. In some examples, the given flight path from the at least two flight paths with the lowest flight path confidence score can have minimal impact on the mission (e.g., minimal to no increase in time needed to complete the mission).

In some examples, the maneuver decision module 232 can be programmed to receive maneuver override data 236 characterizing a different maneuver than being recommended for implementation by the aerial vehicle. The maneuver override data 236 can be provided by another system of the aerial vehicle or be communicated from the base station to the aerial vehicle. The maneuver override data 236 can override the recommended maneuver and cause the maneuver decision module 232 to generate vehicle command data 228 to implement the other maneuver being characterized by the maneuver override data 236.

In some examples, the maneuver decision module 232 can be programmed to generate MLM tuning data 238. The maneuver decision module 232 can be programmed to generate MLM tuning data 238 that can be indicative of whether the recommended maneuver is one a safe maneuver or an unsafe maneuver. In some examples, the MLM tuning data 238 can be indicative of whether the given flight path is one of the safe flight route or the unsafe flight route. The MLM tuning data 238 can be employed to update each respective MLM engine 206 and 208, such that the recommended maneuver is one emphasized in response to determining that the recommended maneuver is safe or deemphasized in response to determining that the recommended maneuver is unsafe, for a subsequent maneuver recommendation. A safe maneuver can correspond to an aerial vehicle maneuver that does not result in structural damage to the aerial vehicle that is equal to or greater than a level of structural risk that has been selected or determined as acceptable for the aerial vehicle. In some examples, the safe maneuver and the unsafe maneuver can correspond to safe and unsafe flight routes, as described herein. Thus, the MLM tuning data 238 can be employed to improve future flight path recommendations of each of the MLM engines 206 and 208 in future adverse weather scenarios.

In some examples, the maneuver decision module 232 can be programmed to receive structural data 240. The maneuver decision module 232 can be programmed to determine a structural integrity of the aerial vehicle based on structural data 240. The structural data 240 can be provided by one or more structural sensors (e.g., a strain gauge, a comparative vacuum monitoring sensor, and the like) of the aerial vehicle and that can be employed to monitor a structural integrity of the aerial vehicle (e.g., monitor the aerial vehicle for structural defects, damage, cracks, and the like). The structural data 240 can characterize the structural integrity of the aerial vehicle, such as after implementing the recommended maneuver (e.g., in some examples after maneuvering the aerial vehicle according to the given flight path through the adverse weather condition). The maneuver decision module 232 can be programmed to evaluate the structural data 240 relative to a structural integrity threshold to determine whether the recommended maneuver (e.g., given flight path) is to be flagged or identified as a safe maneuver (e.g., a safe flight route through the adverse weather condition) for future flight control of the aerial vehicle.

In some examples, the given flight path can be flagged or identified by the maneuver decision module 232 as a safe flight route in response to the maneuver decision module 232 determining that a structural state of the aerial vehicle after being maneuvered through the adverse weather condition is less than the structural integrity threshold. The maneuver decision module 232 can be programmed to generate the MLM tuning data 238 that includes an indication that the given flight path is a safe flight path through the adverse weather condition in response to determining that the structural state of the aerial vehicle is less than the structural integrity threshold. In some examples, the given flight path can be flagged or identified by the maneuver decision module 232 as an unsafe flight route in response to the maneuver decision module 232 determining that a structural state of the aerial vehicle after being maneuvered through the adverse weather condition is greater than or equal to the structural integrity threshold. The maneuver decision module 232 can be programmed to generate the MLM tuning data 238 that includes an indication that the given flight path is an unsafe flight path through the adverse weather condition in response to determining that the structural state of the aerial vehicle is greater than or equal to the structural integrity threshold.

In some examples, the maneuver decision module 232 can be programmed to communicate the recommended maneuver to an authority limit engine 242. The authority limit engine 242 can be programmed to evaluate the recommended maneuver to determine whether the recommended maneuver violates one or more maneuver rules of the maneuver control data 244 for the aerial vehicle. In some examples, maneuver control data 244 can be provided to the aerial vehicle before take-off (e.g., before implementing or carrying out a respective mission). The aerial vehicle can be configured to operate according to the maneuver control data 244 that can include a plurality of maneuver rules that can restrict maneuvers of the aerial vehicle. In some examples, the maneuver control data 244 can include an airspace boundary rule indicative of an airspace boundary (e.g., vertical and/or horizontal boundary) that the aerial vehicle may not be permitted to cross. In other examples, the maneuver control data 244 can include a weather restriction rule that can restrict maneuvering of the aerial vehicle through the adverse weather condition.

In some examples, the maneuver decision module 232 can be programmed override the maneuver control data 244, such as the weather restriction rule, in response to identifying the given flight path and thus permit the aerial vehicle to be maneuvered through the adverse weather condition. In some examples, the maneuver control data 244 can include an airspeed flight restriction rule that set a top speed of the aerial vehicle, a number of degrees of heading change rule that set a permitted heading change for the area vehicle, and the like. Thus, the maneuver control data 244 can include any type of rule that can control the maneuvers (e.g., actions of the aerial vehicle, flight paths of the aerial vehicle, and the like.) of the aerial vehicle. In some examples, the maneuver control data 244 can include mission parameter data that can control maneuvers of the aerial vehicle with respect to a corresponding mission.

In some examples, the authority limit engine 242 can employ the maneuver control data 244 to set or define authority limits for the maneuver decision engine 220 and thus limit types of maneuvers that can be implemented by the aerial vehicle. For example, the authority limit engine 242 can be programmed to evaluate the recommended maneuver to determine whether the recommended maneuver violates the maneuver control data 244. The authority limit engine 242 can be programmed to output maneuver permission data 246 indicative of whether the recommended maneuver violates the maneuver control data 244. Thus, the maneuver permission data 246 can indicate whether the recommended maneuver is permitted or allowed to be implemented by the aerial vehicle.

In some examples, the maneuver decision module 232 can be programmed to override the maneuver control data 244 such as in response to determining that the maneuver confidence score is greater than the maneuver confidence score threshold. For example, if the recommended maneuver corresponds to a respective flight path through the adverse weather condition, the maneuver decision module 232 can be programmed to ignore the maneuver permission data 246 indicating that the recommended maneuver violates the weather restriction rule of the maneuver control data 244 and provide the vehicle command data 228 to implement the recommended maneuver (e.g., such as flying the aerial vehicle through the adverse weather condition). In some examples, the maneuver decision module 232 can be programmed to ignore the weather restriction rule in response to identifying at least one 7path through the adverse weather condition. Accordingly, the maneuver decision module 232 can be programmed to override the maneuver control data 244 in adverse weather condition scenarios, such that the aerial vehicle can be maneuvered through the adverse weather condition.

In some examples, if the maneuver permission data 246 indicates that the recommended maneuver is not permitted to be implemented by the aerial vehicle, the maneuver decision module 232 can be programmed to communicate with each corresponding MLM engine 206 and 208 to receive the updated maneuver recommendation data. The maneuver decision module 232 can be programmed to evaluate the updated maneuver recommendation data to determine whether the updated maneuver recommendation is to be implemented by the aerial vehicle in a same or similar manner as described herein with respect to the maneuver recommendation data 216 and 218 according to the maneuver control data 244.

In some examples, the maneuver decision engine 220 includes an output biasing module 248. The output biasing module 248 can correspond to the output biasing module 114, as illustrated in FIG. 1. The output biasing module 248 can be programmed to influence the output decisions of the MLM engines 206 and 208 and thus modify a behavior of the MLM engines 206 and 208 by determining which output decisions of the MLM engines 206 and 208 are used for aerial vehicle maneuvers based on the level of assumed risk. The output biasing module 248 can be programmed to receive output biasing data 250 for biasing maneuver recommendation outputs of each of the MLM engines 206 and 208 corresponding to the maneuver recommendations being provided by each of the MLM engines 206 and 208. In some examples, the output biasing data 250 can be received by the output biasing module 248, such as during flight or before take-off. The output biasing data 250 can characterize at least one or a plurality of risk tuning parameters that can influence which maneuver recommendations are selected by the maneuver decision module 232 based on the maneuver confidence threshold for implementation by an aerial vehicle.

By way of example, to influence and thus bias maneuver recommendations being provided by each MLM engine 206 and 208, the output biasing module 248 can be programmed to retrieve or receive the maneuver confidence threshold. The output biasing module 248 can be programmed to process the maneuver confidence threshold based on the output biasing data 250. For example, the output biasing module 248 can be programmed to multiply or divide the maneuver confidence threshold by one or more scale factor values of the at least one risk tuning parameter to provide an updated maneuver confidence threshold to influence which of the maneuver recommendations are selected by the maneuver decision module 232 corresponding to output biasing of the MLM engines 206 and 208. The updated maneuver confidence threshold can correspond to the updated maneuver confidence threshold 118, as illustrated in FIG. 1. In some examples, the output biasing module 248 can be programmed to add or subtract the one or more scale factor values of the at least one risk tuning parameter from the maneuver confidence threshold to provide the updated maneuver confidence threshold to influence which of the maneuver recommendations are selected by the maneuver decision module 232 corresponding to the output biasing of the MLM engines 206 and 208.

Thus, in some examples, the updated maneuver confidence threshold can be employed such that the recommended maneuver is implemented whereas the recommended maneuver would have not been implemented by the aerial vehicle if the non-biased maneuver confidence threshold was employed. For example, if a respective maneuver confidence threshold score is less than the maneuver confidence threshold, the output biasing module 248 can be programmed to decrease the maneuver confidence threshold based on the one or more scale factor values, such that the respective maneuver confidence score is greater than or equal to the biased maneuver confidence threshold and can be implemented by the aerial vehicle.

In some examples, the output biasing module 248 can be programmed to update the maneuver confidence threshold based on the output biasing data 250, such that the aerial vehicle can take on a greater amount or a reduced amount of structural risk. For example, if the aerial vehicle is implementing the critical mission (e.g., a wartime mission, a reconnaissance mission, and the like) and the output biasing data 250 indicates that the aerial vehicle is to take on a greater amount of structural risk, the maneuver confidence threshold can be reduced by the output biasing module 248. As such, the maneuver decision module 232 can be programmed to identify one or more recommended maneuvers and thus generate corresponding vehicle command data 228 for carrying out the critical mission that increases a structural risk to the aerial vehicle (e.g., increases a likelihood that the aerial vehicle suffers structural damage, for example, from enemy fire, adverse weather conditions, and the like).

In other examples, if aerial vehicle safety is critical and/or the aerial vehicle is implementing a non-critical mission, the maneuver confidence threshold can be increased by the output biasing module 248 to reduce a likelihood that the aerial vehicle implements maneuvers that increase the structural risk to the aerial vehicle. Thus, the maneuver decision module 232 can be programmed to identify one or more recommended maneuvers and thus generate corresponding vehicle command data 228 for carrying out the critical mission that does not increase the structural risk to the aerial vehicle. Accordingly, the output biasing module 248 can be programmed to bias the outputs corresponding to the recommended maneuvers being provided by each of the MLM engines 206 and 208. Thus, the output biasing module 248 can influence the decisions (e.g., maneuver recommendations) of the maneuver decision module 232 based on an importance of a mission or other factors (e.g., aerial vehicle conditions, such as adverse weather conditions).

Figure 3:
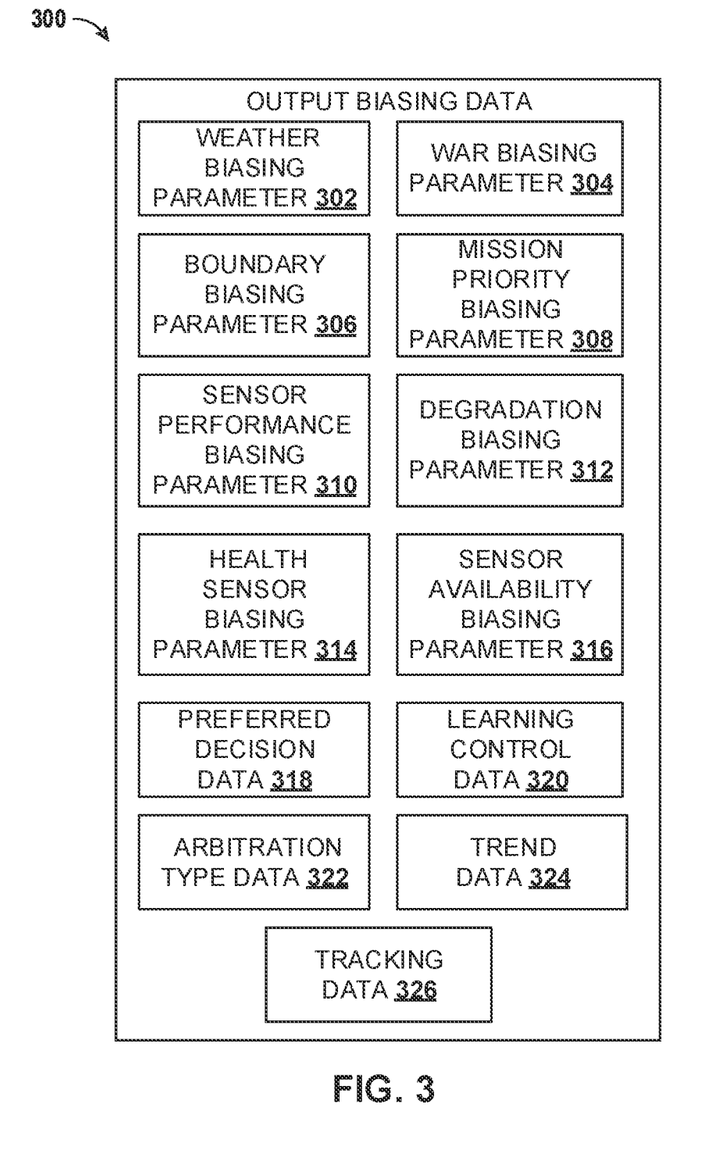
FIG. 3 illustrates an example of engine output biasing data.

FIG. 3 illustrates an example of output biasing data 300. In some examples, the output biasing data 300 can correspond to the output biasing data 116, as illustrated in FIG. 1 or the output biasing data 250, as illustrated in FIG. 2. Therefore, reference may be made to the example of FIGS. 1 and/or 2 in the following description of the example of FIG. 3. The output biasing data 300 can include a plurality of risk tuning parameters that can influence which maneuver recommendations are selected by the maneuver decision module 232 for implementation by an aerial vehicle. Each risk tuning parameter can have a respective amount of influence on the recommended maneuvers that are selected by the maneuver decision module 232. By way of example, the plurality of risk tuning parameters can include a weather biasing parameter 302 indicative of an increased or a decreased level of structural risk to the aerial vehicle during the implementation of the maneuver recommendations with respect to adverse weather conditions. Thus, in some examples, the weather biasing parameter 302 can include a weather biasing scale factor (e.g., value). The maneuver confidence threshold can be updated based on the weather biasing parameter (e.g., by being multiplied or divided by the weather biasing scale factor, or by adding or subtracting the weather biasing scale factor from the maneuver confidence threshold).

In some examples, the plurality of risk tuning parameters can include a war biasing parameter 304 indicative of the increased or decreased level of structural risk to the aerial vehicle during the implementation of the maneuver recommendations with respect to a war condition. Thus, in some examples, the war biasing parameter 304 can include a war biasing scale factor. The maneuver confidence threshold can be updated based on the war biasing scale factor (e.g., by being multiplied or divided by the war biasing scale factor, or by adding or subtracting the war biasing scale factor from the maneuver confidence threshold).

By way of further example, the plurality of risk tuning parameters can include a boundary biasing parameter 306 indicative of an increased or a decreased level of structural risk for the aerial vehicle with respect to a flight boundary restriction. Thus, in some examples, the boundary biasing parameter 306 can include a boundary biasing scale factor. The maneuver confidence threshold can be updated based on the war biasing scale factor (e.g., by being multiplied or divided by the boundary biasing scale factor, or by adding or subtracting the boundary biasing scale factor from the maneuver confidence threshold).

In some examples, the output biasing data 300 can include a mission priority biasing parameter 308 indicative of a mission priority for a mission for the aerial vehicle and can include a mission priority biasing scale factor. For example, if the mission priority biasing parameter 308 indicates that the mission is critical, the mission priority biasing scale factor can be employed to update the maneuver confidence threshold (e.g., by being multiplied or divided by the mission priority biasing scale factor, or by adding or subtracting the mission priority biasing scale factor from the maneuver confidence threshold) to permit maneuvers to be implemented by the aerial vehicle that increases a likelihood that the aerial vehicle can suffer structural damage. In other examples, if the mission priority biasing parameter 308 indicates that the mission is critical, the mission priority biasing scale factor can be employed to update the maneuver confidence threshold to permit the recommended maneuver to be implemented by the aerial vehicle that does not increase or reduce the likelihood that the aerial vehicle suffers structural damage while implementing the permitted recommended maneuver. In the above examples, the mission priority scale factor can have a first mission priority value if the mission priority biasing parameter 308 indicates that the mission is critical, and a second mission priority value if the mission priority biasing parameter 308 indicates that the mission is non-critical.

In some examples, the output biasing data 300 can include a sensor performance biasing parameter 310 which can include a sensor performance biasing scale factor. The sensor performance biasing parameter 310 can be indicative of whether one or more sensors of the aerial vehicle or one or more off-board sensors are to be employed to provide at least a subset of sensor data of the sensor data, such as described herein. For example, if the sensor performance biasing parameter 310 indicates that the one or more sensors (e.g., an on-board radar sensor or system) of the aerial vehicle is to provide the at least subset of sensor data, the sensor performance biasing scale factor with a first sensor performance value can be employed to update the maneuver confidence threshold to permit the recommended maneuver to be implemented by the aerial vehicle, which has increases a likelihood that the aerial vehicle suffers structural damage.

In other examples, if the sensor performance biasing parameter 310 indicates that one or more off-board sensors (e.g., a ground radar sensor) is to provide the at least subset of sensor data, the sensor performance biasing scale factor with a second sensor performance value can be employed to update the maneuver confidence threshold to permit the recommended maneuver to be implemented by the aerial vehicle that does not increase or reduces the likelihood that the aerial vehicle suffers structural damage. Because the at least subset of sensor data is not provided by the one or more sensors of the aerial vehicle, in some examples, the sensor data may not be as accurate as the at least subset of sensor data provided by the one or more sensors of the aerial vehicle, which can increase a structural risk to the aerial vehicle. In some examples, a time delay of communicating the at least subset of sensor data from the one or more off-board sensors to the aerial vehicle can introduce a latency that is greater than is permitted for processing and thus identifying or selecting recommended maneuvers by the maneuver decision module 232. The output biasing module 248 can be programmed to update the maneuver confidence threshold based on the second sensor performance value, such that the aerial vehicle is permitted to implement recommended maneuvers that do not increase the likelihood that the aerial vehicle suffers structural damage. As such, the output biasing module 248 can be programmed to reduce the likelihood that the aerial vehicle suffers structural in examples wherein at least the subset of sensor data is provided by the one or more off-board sensors based on the sensor performance biasing parameter 310.

In some examples, the output biasing data 300 can include a degradation biasing parameter 312 that can include a degradation biasing scale factor. The degradation biasing parameter 312 can be indicative of a level of degradation for the ML input data 214 being received or provided to each of the MLM engines 206 and 208. The output biasing module 248 can be programmed to evaluate the ML input data 214 to determine a level of data degradation. If the level of data degradation is greater than or equal to a degradation threshold as defined by the degradation biasing parameter 312, the output biasing module 248 can update the maneuver confidence threshold based on the degradation biasing scale factor having a first degradation value to permit recommended maneuvers to be implemented by the aerial vehicle that increases a likelihood that the aerial vehicle suffers structural damage. In some examples, if the level of data degradation is less than the degradation threshold, the output biasing module 248 can update the maneuver confidence threshold based on the degradation biasing scale factor having a second degradation value to permit recommended maneuvers to be implemented by the aerial vehicle that increases a likelihood that the aerial vehicle suffers structural damage.

In some examples, the output biasing data 300 can include a health sensor biasing parameter 314. The health sensor biasing parameter 314 can be indicative of a sensor health threshold for the one or more sensors of the aerial vehicle.

In some examples, the health sensor biasing parameter 314 can include a health sensor biasing scale factor. Thus, in some examples, the output biasing module 248 can be programmed to receive sensor health data 252 indicative of sensor health of the one or more sensors of the aerial vehicle and evaluate the sensor health data relative to the health sensor threshold for maneuver recommendation biasing.

For example, the output biasing module 248 can be programmed to determine whether the sensor health data is less than or equal to the health sensor threshold. The output biasing module 248 can be programmed to update the maneuver confidence threshold based on the health sensor biasing scale factor to permit recommended maneuvers to be implemented by the aerial vehicle that does not increase or reduce the likelihood that the aerial vehicle suffers structural damage. As such, in some examples, wherein the sensor health of the one or more sensors has suffered (e.g., the sensor has been damaged), the output biasing module 248 can be programmed to update the maneuver confidence threshold based on the health sensor biasing scale factor, such that the aerial vehicle does not implement maneuvers that may increase the likelihood that the aerial vehicle suffers structural damage.

In some examples, the output biasing data 300 can include a sensor availability biasing parameter 316. The sensor availability biasing parameter 316 can be employed to bias output recommendations of the MLM engines 206 and 208 based on sensor availability data 254 received by the output biasing module 248. In some examples, the sensor availability biasing parameter 316 can include a sensor availability biasing scale factor. For example, if the sensor availability data 254 indicates that the one or more sensors on-board the aerial vehicle is not available to provide at least the subset of sensor data, the sensor availability biasing scale factor can be employed to update the maneuver confidence threshold to permit maneuvers to be implemented by the aerial vehicle that does not increase or reduce the likelihood that the aerial vehicle suffers structural damage. As such, in some examples, wherein the one or more sensors of the aerial vehicle is not available (e.g., because the sensor is being jammed), the output biasing module 248 can be programmed to update the maneuver confidence threshold based on the sensor availability biasing scale factor, such that the aerial vehicle does not implement maneuvers that may increase the likelihood that the aerial vehicle suffers structural damage.

In some examples, the output biasing data 300 can include preferred decision data 318. The preferred decision data 318 can identify one or more preferred maneuvers to be implemented by the aerial vehicle, such as in response to the respective aerial vehicle condition. For example, if the aerial vehicle detects or identifies a hostile enemy, the preferred decision data 318 can be indicative that the aerial vehicle is to implement maneuvers that reduce the likelihood that the aerial vehicle suffers structural damage from the hostile enemy (e.g., by being shut down). The maneuver decision module 232 can be programmed to evaluate each recommended maneuver from each MLM engine 206 and 208 based on the preferred decision data 318 and select or identify recommended maneuvers for implementation by the aerial vehicle that improves the likelihood that the aerial vehicle does not suffer structural damage.

In some examples, the output biasing data 300 can include learning control data 320. The learning control data 320 can be indicative of whether each of the MLM engines 206 and 208 are permitted to learn and improve a quality and/or accuracy of future maneuver recommendations based on past maneuver recommendations that the MLM engines 206 and 208 had provided. In some examples, the learning control data 320 can indicate that each of the MLM engines 206 and 208 are not permitted to learn, and the maneuver decision module 232 can be programmed to not provide the MLM tuning data 238 to each of the MLM engines 206 and 208. Thus, the learning control data 320 can control a learning process of each of the MLM engines 206 and 208. In some examples, the output biasing data 300 can include arbitration type data 322. The arbitration type data 322 can determine or specify one or more data processing schemes for the maneuver decision module 232.

In some examples, the output biasing data 300 can include trend data 268. The trend data 268 can be indicative of past decision trends with respect to which maneuver recommendations had been selected by the maneuver decision module 232 (e.g., automatically or response to a user input). The past decision trends can be employed by the output biasing module 248 to influence which maneuver recommendations are selected by the maneuver decision module 232 for implementation by the aerial vehicle. In some examples, the output biasing data 300 can include tracking data 270. The tracking data 270 can characterize one or more previous maneuvers with respect to geographic conditions. A maneuver may be based on a historical track associated with certain geographic conditions. An example, if historically an aircraft is maneuvered on a specific flight path to avoid terrain or encroaching airspace, then the maneuver decision made by the maneuver decision module 232 may be biased by these previously established safe flight paths based on the tracking data.

Accordingly, the output biasing module 248 can be programmed to influence the output decisions of the maneuver decision module 232 and thus modify the behavior of the MLM engines 206 and 208 by determining which output decisions of the MLM engines 206 and 208 are to be employed for aerial vehicle control based on a level of assumed risk as defined by the output biasing data 250. As such, the output biasing module 248 can be programmed to allow for alterations (e.g., tuning) of output decisions of the MLM engines 206 and 208 based on a level of assumed risk that has been determined acceptable for the MLM engines 206 and 208 according to the output biasing data 250.

Figure 4:
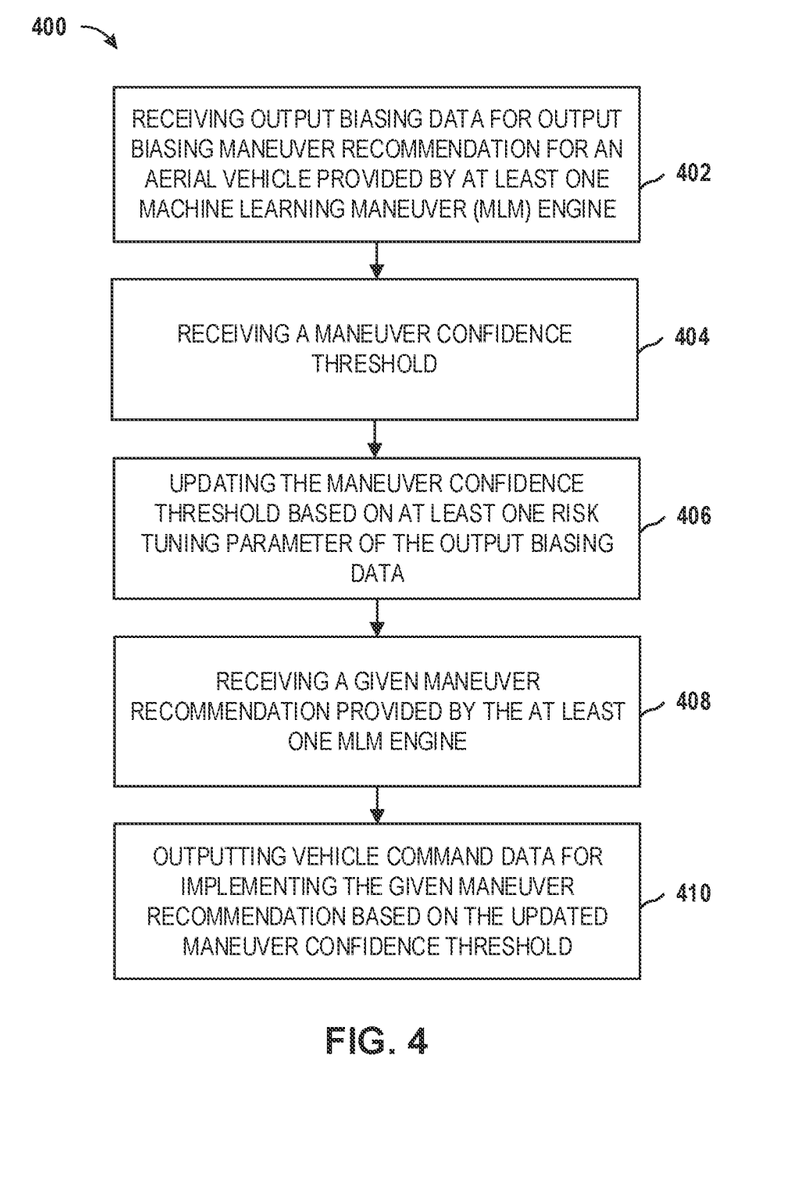
FIG. 4 illustrates an example of a method for output biasing maneuver recommendations being provided by an MLM engine.

In view of the foregoing structural and functional features described above, example methods will be better appreciated with reference to FIG. 4. While, for purposes of simplicity of explanation, the example method of FIG. 4 is shown and described as executing serially, it is to be understood and appreciated that the example method is not limited by the illustrated order, as some actions could in other examples occur in different orders, multiple times and/or concurrently from that shown and described herein.

FIG. 4 illustrates an example of a method 400 for output biasing maneuver recommendations being provided by an MLM engine. The method 400 can be implemented by the output biasing module 114, as illustrated in FIG. 1 or the output biasing module 248, as illustrated in FIG. 2. The MLM engine can correspond to the MLM engine 108, as illustrated in FIG. 1 or the MLM engines 206 and 208, as illustrated in FIG. 2. The method 400 can begin at 402 by the output biasing module receiving output biasing data (e.g., the output biasing data 116, as illustrated in FIG. 1, the output biasing data 250, as illustrated in FIG. 2 or the output biasing data 300, as illustrated in FIG. 3) that can include at least one risk tuning parameter for output biasing maneuver recommendations for an aerial vehicle being provided by at least one MLM engine. At 404, receiving a maneuver confidence threshold that can correspond to a first level of structural damage that the aerial vehicle can be permitted to experience during implementations of the maneuver recommendations.

At 406, updating the maneuver confidence threshold based on the at least one risk tuning parameter to influence the maneuver recommendations selected by a maneuver decision engine (e.g., the maneuver decision engine 106, as illustrated in FIG. 1 or the maneuver decision engine 220, as illustrated in FIG. 2) for implementation by the aerial vehicle to provide an updated maneuver confidence threshold. The updated maneuver confidence threshold can correspond to a second level of structural damage that the aerial vehicle can be permitted to experience during the implementations of the maneuver recommendations. At 408, receiving a given maneuver recommendation provided by the at least one MLM engine. At 410, outputting vehicle command data (e.g., the vehicle command data 120, as illustrated in FIG. 1 or the vehicle command data 228, as illustrated in FIG. 2) for implementing the given maneuver recommendation based on an evaluation of the updated maneuver confidence threshold.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising:
    receiving output biasing data comprising at least one risk tuning parameter for output biasing maneuver recommendations for an aerial vehicle being provided by at least one machine learning maneuver-recommendation (MLM) engine;
    receiving a maneuver confidence threshold corresponding to a first level of structural damage that the aerial vehicle is permitted to experience during implementations of the maneuver recommendations;
    updating the maneuver confidence threshold based on the at least one risk tuning parameter to influence the maneuver recommendations selected by the at least one MLM for implementation by the aerial vehicle to provide an updated maneuver confidence threshold, wherein the updated maneuver confidence threshold corresponds to a second level of structural damage that the aerial vehicle is permitted to experience during the implementations of the maneuver recommendations;
    receiving a given maneuver recommendation provided by the at least one MLM engine;
    outputting vehicle command data for implementing the given maneuver recommendation based on an evaluation of the updated maneuver confidence threshold,
    wherein the at least one risk tuning parameter further comprises a sensor performance biasing parameter indicative of whether one or more sensors of the aerial vehicle or one or more sensors at a remote location are to be employed to provide at least a subset of sensor data that is employed by the at least one MLM engine to provide the maneuver recommendations, the maneuver confidence threshold further being updated based on the sensor performance biasing parameter, and the at least one risk tuning parameter further comprises a degradation biasing parameter indicative of a level of degradation for machine learning (ML) input data being received at the at least one MLM engine, the ML input data including the subset of sensor data and the at least one MLM engine being configured to provide the maneuver recommendations based on the ML input data, the maneuver confidence threshold further being updated based on the degradation biasing parameter, such that the at least one MLM engine provides a maneuver recommendation that increases a likelihood of structural damage to the aerial vehicle.

2. The method of claim 1, wherein the updating comprises multiplying or dividing the maneuver confidence threshold by one or more scale factor values of the at least one risk tuning parameter to provide the updated maneuver confidence threshold to influence which of the maneuver recommendations are selected by the maneuver decision engine corresponding to output biasing of the at least one MLM engine.

3. The method of claim 1, wherein the updating comprises adding or subtracting one or more scale factor values of the at least one risk tuning parameter from the maneuver confidence threshold to provide the updated maneuver confidence threshold to influence which of the maneuver recommendations are selected by the maneuver decision engine corresponding to output biasing of the at least one MLM engine.

4. The method of claim 1, wherein the at least one risk tuning parameter comprises a weather biasing parameter indicative of an increased or a decreased level of structural risk to the aerial vehicle during the implementations of the maneuver recommendations with respect to adverse weather conditions, the maneuver confidence threshold being updated based on the weather biasing parameter.

5. The method of claim 4, wherein the at least one risk tuning parameter further comprises a mission biasing parameter indicative of the increased or the decreased level of structural risk to the aerial vehicle during the implementation of the maneuver recommendations with respect to a war condition, the maneuver confidence threshold further being updated based on the mission biasing parameter.

6. The method of claim 5, wherein the at least one risk tuning parameter further comprises a boundary biasing parameter indicative of the increased or the decreased level of structural risk to the aerial vehicle during the implementation of the maneuver recommendations with respect to a flight boundary restriction, the maneuver confidence threshold further being updated based on the boundary biasing parameter.

7. The method of claim 6, wherein the at least one risk tuning parameter further comprises a mission priority biasing parameter indicative of a mission priority for a mission being implemented by the aerial vehicle, the maneuver confidence threshold further being updated based on the mission priority biasing parameter.

8. The method of claim 7, wherein the at least one risk tuning parameter further comprises a health sensor biasing parameter indicative of a sensor health threshold for the one or more sensors of the aerial vehicle, the maneuver confidence threshold further being updated based on the health sensor biasing parameter.

9. The method of claim 8, wherein the at least one risk tuning parameter further comprises a sensor availability biasing parameter indicative of a sensor availability scale factor, the maneuver confidence threshold further being updated based on the sensor availability biasing parameter.

10. The method of claim 9, further comprising generate MLM tuning data for tuning the at least one MLM engine, the MLM tuning data being indicative of whether the given maneuver recommendation is one of a safe maneuver or an unsafe maneuver for the aerial vehicle in response to the aerial vehicle implementing the given maneuver recommendation.

11. The method of claim 10, wherein the given maneuver recommendation is identified as the safe maneuver in response to determining that a structural state of the aerial vehicle after implementing the given maneuver recommendation is less than a structural integrity threshold and the given maneuver recommendation is identified as the unsafe maneuver in response to determining that the structural state of the aerial vehicle after implementing the given maneuver recommendation is greater than the structural integrity threshold.

12. The method of claim 11, wherein the given maneuver recommendation includes a recommended flight path through an adverse weather condition.

13. A system comprising:
memory to store machine-readable instructions and data, the data comprising output biasing data comprising a plurality of risk tuning parameters for output biasing maneuver recommendations for an aerial vehicle provided by at least one machine learning maneuver-recommendation (MLM) engine, and a maneuver confidence threshold corresponding to a first level of structural damage that the aerial vehicle is permitted to experience during implementations of the maneuver recommendations, wherein the plurality of risk tuning parameters comprises:
a sensor performance biasing parameter indicative of whether one or more sensors of the aerial vehicle or one or more sensors at a remote location are to be employed to provide at least a subset of sensor data that is employed by the at least one MLM engine to provide the maneuver recommendations;
a degradation biasing parameter indicative of a level of degradation for ML input data being received at the at least one MLM engine, the ML input data including the subset of sensor data; and
one or more processors to access the memory and execute the machine-readable instructions, the machine-readable instructions comprising:
an output biasing module programmed to:
adjust the maneuver confidence threshold based on the at least one risk tuning parameter to influence the maneuver recommendations selected by the maneuver decision engine for implementation by the aerial vehicle to provide an adjusted maneuver confidence threshold, wherein the adjusted maneuver confidence threshold corresponds to a second level of structural damage that the aerial vehicle is permitted to experience during implementations of the maneuver recommendations, wherein the second level of structural damage is greater than the first level of structural damage; and
a maneuver decision module programmed to:
communicate with the output biasing module to receive the adjusted maneuver confidence threshold;
receive maneuver data provided by the at least one MLM engine, wherein the maneuver data comprises a given maneuver recommendation for the aerial vehicle and a maneuver confidence score that is indicative of a probability of the aerial vehicle suffering structural damage that meets or exceeds the second level of structural damage in response to or while implementing the given maneuver recommendation; and
evaluate the maneuver confidence score relative to the adjusted maneuver confidence threshold to determine whether the aerial vehicle is to implement the given maneuver recommendation.

14. The system of claim 13, wherein the maneuver decision module is programmed to output vehicle command data for implementing the given maneuver recommendation based on the evaluation indicating that the maneuver confidence score is greater or equal to the adjusted maneuver confidence threshold.

15. The system of claim 14, wherein the plurality of risk tuning parameters further comprising at least two of:
a weather biasing parameter indicative of an increased or a decreased level of structural risk to the aerial vehicle during the implementations of the maneuver recommendations with respect to adverse weather conditions;
a mission biasing parameter indicative of the increased or the decreased level of structural risk to the aerial vehicle during the implementations of the maneuver recommendations with respect to a war condition;
a boundary biasing parameter indicative of the increased or the decreased level of structural risk to the aerial vehicle during the implementations of the maneuver recommendations with respect to a flight boundary restriction;
a mission priority biasing parameter indicative of a mission priority for a mission being implemented by the aerial vehicle;
a health sensor biasing parameter indicative of a sensor health threshold for the one or more sensors of the aerial vehicle; and
a sensor availability biasing parameter indicative of a sensor availability scale factor.

16. The system of claim 15, wherein the maneuver decision module is further programmed to generate MLM tuning data for tuning the at least one MLM engine, the MLM tuning data being indicative of whether the given maneuver recommendation is one a safe maneuver or an unsafe maneuver for the aerial vehicle.

17. A method comprising:
receiving output biasing data comprising a plurality of risk tuning parameters for output biasing maneuver recommendations for an aerial vehicle provided by at least one machine learning maneuver-recommendation (MLM) engine, wherein the plurality of risk tuning parameters comprises:
a sensor performance biasing parameter indicative of whether one or more sensors of the aerial vehicle or one or more sensors at a remote location are to be employed to provide at least a subset of sensor data that is employed by the at least one MLM engine to provide the maneuver recommendations;
a degradation biasing parameter indicative of a level of degradation for ML input data being received at the at least one MLM engine, the ML input data including the subset of sensor data;
receiving from a maneuver decision engine a maneuver confidence threshold corresponding to a first level of structural damage that the aerial vehicle is permitted to experience during implementations of the maneuver recommendations;

biasing the maneuver confidence threshold based on the plurality of tuning parameters to influence the maneuver recommendations selected by the maneuver decision engine for implementation by the aerial vehicle to provide a biased maneuver confidence threshold, wherein the biased maneuver confidence threshold corresponds to a second level of structural damage that the aerial vehicle is permitted to experience during the implementations of the maneuver recommendations, wherein the second level of structural damage is greater than the first level of structural damage;

receiving maneuver data provided by the at least one MLM engine, wherein the maneuver data comprises a given maneuver recommendation for the aerial vehicle and a maneuver confidence score that is indicative of a probability of the aerial vehicle suffering structural damage that meets or exceeds the second level of structural damage in response to or while implementing the given maneuver recommendation; and causing the aerial vehicle to implement the given maneuver recommendation based on an evaluation of the maneuver confidence score relative to the biased maneuver confidence threshold.

18. The method of claim 17, wherein the plurality of risk tuning parameters further comprising at least one of:
- a mission priority biasing parameter indicative of a mission priority for a mission being implemented by the aerial vehicle;
- a health sensor biasing parameter indicative of a sensor health threshold for the one or more sensors of the aerial vehicle; and
- a sensor availability biasing parameter indicative of a sensor availability scale factor.

* * * * *